United States Patent
Kim et al.

(10) Patent No.: US 8,880,743 B2
(45) Date of Patent: Nov. 4, 2014

(54) METHOD FOR PROVIDING SERVICE EXECUTED IN VARIOUS SERVICE MODULES AND HOME GATEWAY USING THE SAME

(75) Inventors: Hyun Woo Kim, Seoul (KR); Jae Gi Son, Seongnam-si (KR); Young Hwan Kim, Yongin-si (KR); Chang Won Park, Suwon-si (KR)

(73) Assignee: Korea Electronics Technology Institute, Seongnam-Si, Gyeonggi-Do (KR)

( * ) Notice: Subject to any disclaimer, the term of this patent is extended or adjusted under 35 U.S.C. 154(b) by 17 days.

(21) Appl. No.: 13/338,779

(22) Filed: Dec. 28, 2011

(65) Prior Publication Data
US 2012/0173763 A1    Jul. 5, 2012

(30) Foreign Application Priority Data

Jan. 5, 2011 (KR) .................. 10-2011-0001136

(51) Int. Cl.
*G06F 3/00* (2006.01)

(52) U.S. Cl.
CPC ............................ *H01L 12/2834* (2013.01)
USPC .................................................. 710/5; 710/2

(58) Field of Classification Search
None
See application file for complete search history.

(56) References Cited

U.S. PATENT DOCUMENTS

| 8,665,885 B2 * | 3/2014 | Pastorino et al. ............. 370/401 |
| 2009/0147696 A1 * | 6/2009 | Park et al. ...................... 370/252 |
| 2011/0106279 A1 * | 5/2011 | Cho et al. ........................ 700/90 |

* cited by examiner

*Primary Examiner* — Idriss N Alrobaye
*Assistant Examiner* — Richard B Franklin
(74) *Attorney, Agent, or Firm* — Lowe Hauptman & Ham, LLP

(57) ABSTRACT

A method for providing a service executed in various service modules, and a home gateway using the same are provided. The service providing method displays a function result of a service module mounted to a module port to which a variety of service modules are selectively mountable, in a display connected. Hence, various services executed in various service modules can be provided reasonably and effectively.

16 Claims, 2 Drawing Sheets

METHOD FOR PROVIDING SERVICE EXECUTED IN VARIOUS SERVICE MODULES AND HOME GATEWAY USING THE SAME

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Jan. 5, 2011, and assigned Serial No. 10-2011-0001136, the entire disclosure of which is hereby incorporated by reference.

TECHNICAL FIELD OF THE INVENTION

The present invention relates generally to a service providing method and a home gateway using the same. More particularly, the present invention relates to a method for providing various services to a user via a home network, and a home gateway using the same.

BACKGROUND OF THE INVENTION

As home gateways in the home are converged and complexity of various services increases, industry vitalization reaches the limit because of development and compatibility problems of core service modules (H/W and S/W).

In particular, in an intelligent home network industry, a platform and a resource management module capable of ensuring interoperability between services are required. Diversity of a STB or a modem supplied by a provider according to various services is an obstacle to the development of the home network.

So far, while a variety of services are provided based on the home gateway in the home, their convergence is limited by different service types and modules.

Accordingly, the existing home service merely combined has the limits according to absence of expandability, absence of mobility, and incomplete convergence in current smart home, smart phone, and smart office environments for supporting multiple services.

To expand a new service in the home network, a new service system should be introduced separately from the existing system, which, disadvantageously, incurs costs and requires an installation space.

SUMMARY OF THE INVENTION

To address the above-discussed deficiencies of the prior art, it is a primary aspect of the present invention to provide a method for reasonably and effectively providing various services executed in various service modules, and a home gateway using the same.

According to one aspect of the present invention, a method for providing a service includes receiving a function result of a service module mounted to a module port; and displaying the function result in a display connected. A variety of services modules are selectively mountable to the module port.

At least one service module may be mountable to the module port, the service providing method may further include detecting the number of the service modules mounted to the module port, and the receiving operation of the function result may be performed when a single service module is detected in the detecting operation.

The service providing method may further include when multiple service modules are detected in the detecting operation, determining whether it is possible to provide all of services provided by the service modules mounted to the module port; and when it is possible to provide all of the services, providing the services all together.

The service providing method may further include when determining that it is impossible to provide all of the services in the determining operation, determining priorities of the services; and providing the services in sequence according to the priority.

The service module may include at least one of a module for providing a health related service, a module for providing an entertainment service, a module for controlling home appliances, a module for providing environment information, and a module for supporting wireless communication of mobile devices.

According to another aspect of the present invention, a home gateway includes a module port to which various service modules are selectively mounted; an interface for connecting with a display; and a processor for receiving a function result of a service module mounted through the module port, sending the function result to the display connected to the interface, and displaying the function result in the display.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents.

Figure 1:
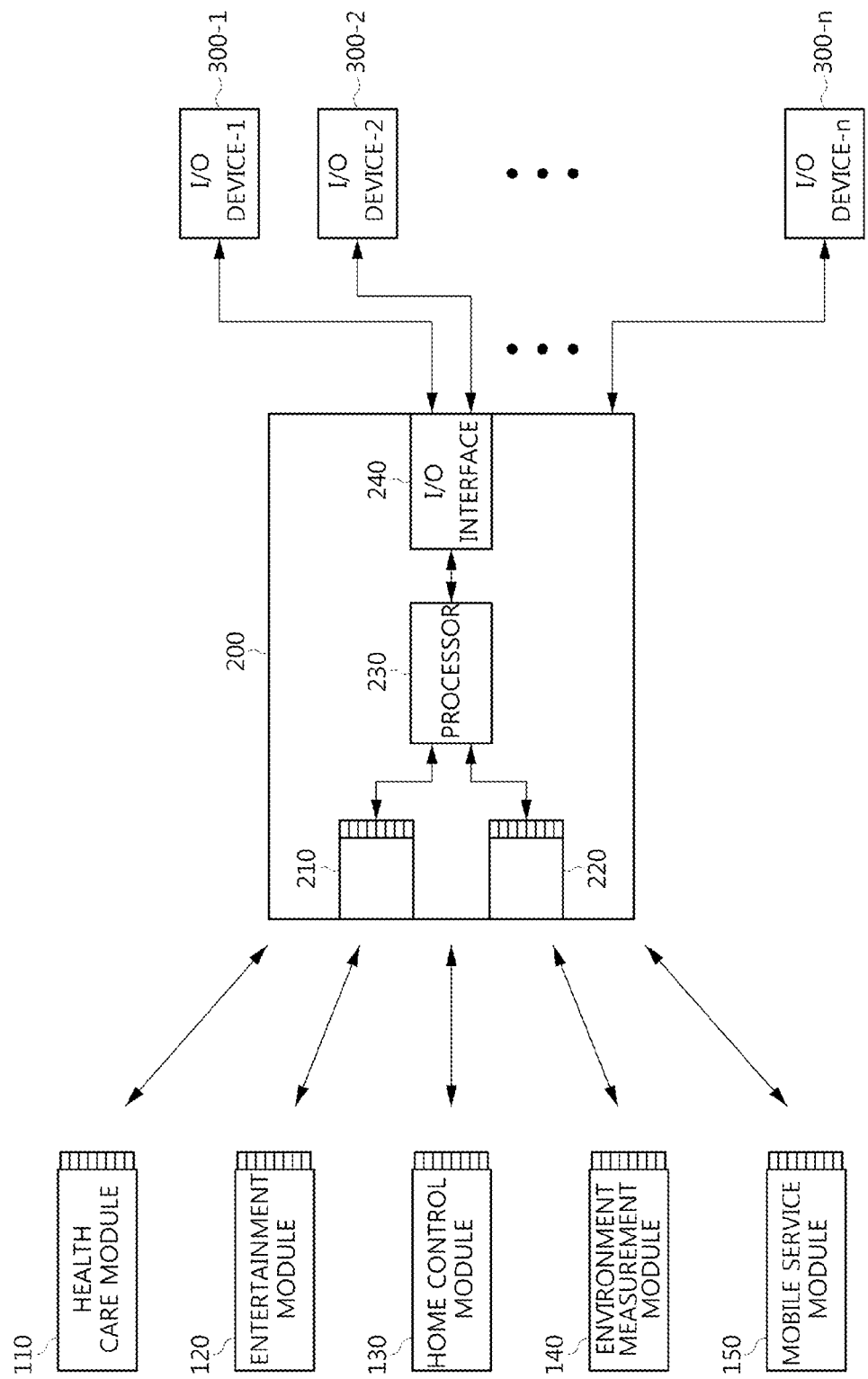
FIG. 1 is a diagram of a home service providing system according to an exemplary embodiment of the present invention.

FIG. 1 is a diagram of a home service providing system according to an exemplary embodiment of the present invention. As shown in FIG. 1, the home service providing system is constructed by connecting I/O devices 300-1 through 300-n to a home gateway 200 to which service modules 110 through 150 can be selectively mounted.

The service modules 110 through 150 provide particular services, and the provided services are different per service module. In detail, 1) a health care module 110, which is a module for a health care service, collects and analyzes biometric data (height, weight, blood pressure, blood sugar, etc.) of a user, physical strength data (muscular power, endurance, reflexes, etc.) of the user, and exercise data of the user, and then generates and provides health care information of the user (physical constitution status of the user, a suspected disease of the user, physical strength information of the user, required exercise/current exercise/remaining exercise of the user, etc.), 2) an entertainment module 120 provides the user with an entertainment service such as contents and amusements,
3) a home control module 130 controls home appliances,
4) an environment measurement module 140 provides indoor/outdoor environment information, and
5) a mobile service module 150 supports wireless communications of mobile devices.

A single or multiple service modules 110 through 150 can be selectively mounted to PCIE ports 210 and 220 of the home gateway 220. For example,
1) the health care module 110 can be mounted to the first PCIE port 210 and no service module can be mounted to the second PCIE port 220,
2) no service module can be mounted to the first PCIE port 210 and the health care module 110 can be mounted to the second PCIE port 220,
3) the health care module 110 can be mounted to the first PCIE port 210 and the entertainment module 120 can be mounted to the second PCIE port 220, or
4) the health care module 110 can be mounted to the first PCIE port 210 and the home control module 130 can be mounted to the second PCIE port 220.

As such, the single or multiple service modules 110 through 150 can be selectively mounted to the home gateway 200 according to the PCIE standard.

Meanwhile, the home gateway 200 includes the PCIE ports 210 and 220, a processor 230, and an I/O interface 240 as shown in FIG. 1.

The PCIE ports 210 and 220 are the ports for selectively mounting the single or multiple service modules 110 through 150 according to the PCIE standard.

Various I/O devices 300-1 through **300-*n* can be connected to the I/O interface 240. The connectable I/O devices 300-1 through 300-*n*** include an external input device, a memory card, Ethernet equipment for accessing Ethernet, a USB device, and a display such as TV.

The processor 230 receives the service which is provided according to the function result of at least one service module mounted to the PCIE ports 210 and 220, and offers the service to the user by controlling the I/O interface 240.

The service provided according to the function result of the service module is as follows.
1) The health care module 110 provides the health care information of the user.
2) The entertainment module 120 provides the amusement/contents.
3) The home control module 130 controls the home appliances.
4) The environment measurement module 140 provides the indoor/outdoor environment information.
5) The mobile service module 150 supports the wireless communication of the mobile devices.

Figure 2:
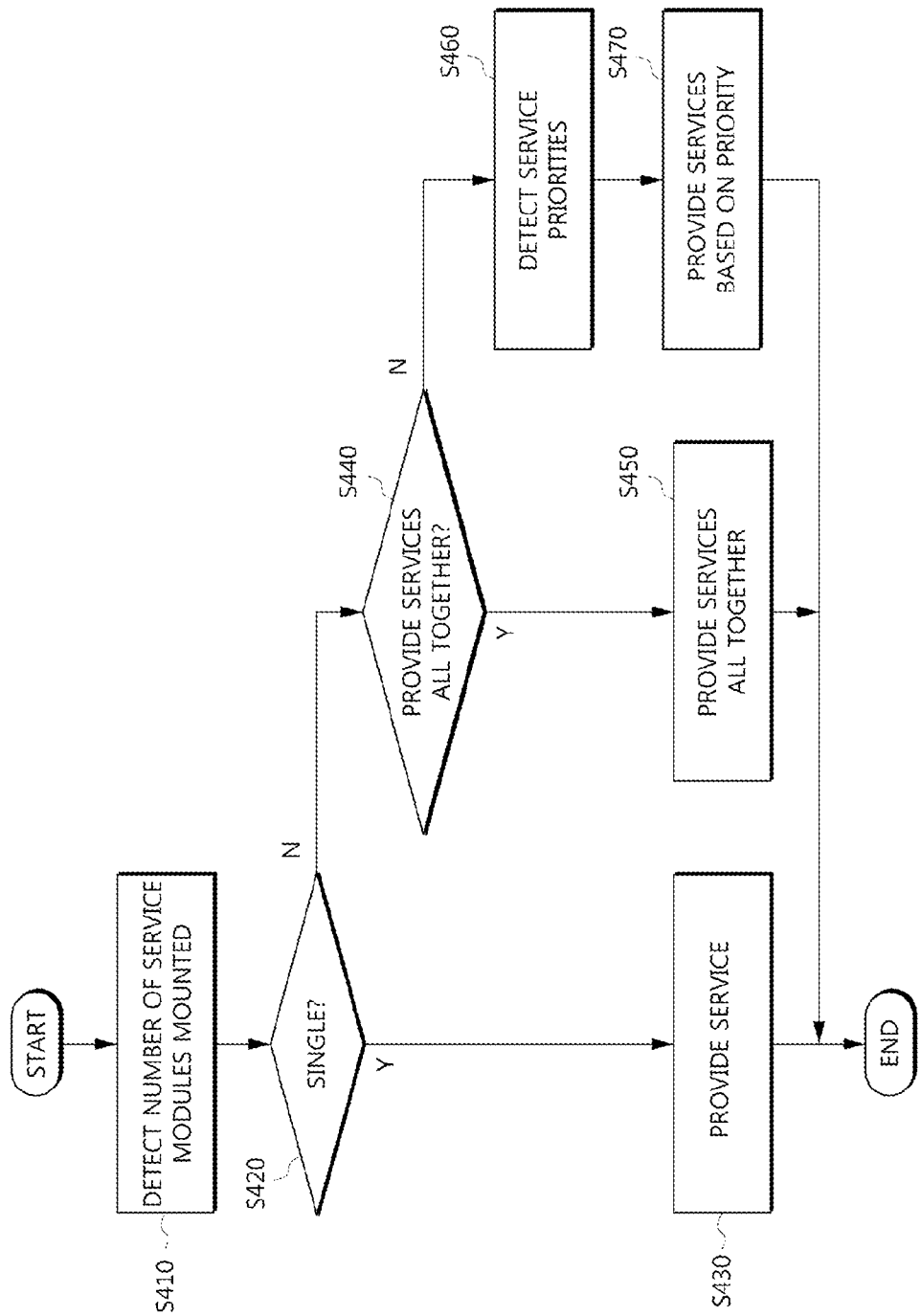
FIG. 2 is a flowchart of a service providing method according to an exemplary embodiment of the present invention.

Hereafter, a method of the processor 230 for receiving the service provided according to the function result of at least one service module selectively mounted to the PCIE ports 210 and 220 and providing the service to the user is explained in detail by referring to FIG. 2. FIG. 2 is a flowchart of a service providing method according to an exemplary embodiment of the present invention.

As shown in FIG. 2, the processor 230 obtains the number of the service modules mounted to the PCIE ports 210 and 220 (S410).

When the single service module is detected in S410, (S420-Y), the processor 230 provides the function result of the mounted service module to the user as the service (S430).

For example, when the health care module 110 is mounted to the first PCIE port 210 and no service module is mounted to the second PCIE port 220, the processor 230 sends and displays the health care information generated by the health care module 110 to the TV connected through the I/O interface 240.

When the multiple service modules are detected in S410 (S420-N), the processor 230 determines whether the services of the mounted service modules can be provided all together (S440).

It is assumed that the health care module 110 is mounted to the first PCIE port 210 and the mobile service module 150 is mounted to the second PCIE port 220. In this case, the health care information of the user, which is the service provided by the health care module 110, and the wireless communication support of the mobile services, which is the service provided by the mobile service module 150, correspond the services which can be provided together.

As such, when the services can be provided all together (S440-Y), the processor 230 provides the user with the services of the mounted service modules all together (S450).

When determining that it is infeasible to provide the services of the mounted services modules all together (S440-N), the processor 230 obtains the priorities of the services (S450).

According to the priorities obtained in S450, the processor 230 controls to provide the services in sequence (S460).

It is assumed that the health care module 110 is mounted to the first PCIE port 210 and the home control module 130 is mounted to the second PCIE port 220. Both of the health care information of the user, which is the service provided by the health care module 110, and the home appliance control, which is the service provided by the home control module 130, interact with the user using the TV. Hence, the health care information of the user and the home appliance control service correspond to the services which cannot be provided together.

Provided that the priority of the home appliance control service is higher than the priority of the health care information service, the processor 230 controls to first provide the home appliance control service in S470. When the home device control service ends, the processor 230 controls to provide the health care information service.

As explained above, various services executed in the various service modules can be provided reasonably and effectively. According to the convergence of the ubiquitous environment and the next-generation wired/wireless networks, common resource management and service management in the platform are feasible to support the efficient service support between the heterogeneous service modules of the modular-type integrated service support home platform and the service module support platform for supporting the heterogeneous networking environments in the home and the user's selected service.

In addition, it is possible to support the heterogeneous independent home network services by means of the modular-type home platform, and to prevent the performance degradation in the service expansion and the service migration.

Even when a new service of the user generates, the common resources to support the home network can be shared fundamentally and thus it is advantageous in terms of the development duration and the costs of a service developing company.

Further, it is possible to establish a bridgehead of the technology development for the interface, the reusability, the portability, and the expandability of the service module level, and various service SWs.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method performed by a home gateway, the method comprising:
    detecting the number of service modules mounted to module ports of the home gateway;
    providing a service by a single service module mounted to the corresponding module port of the home gateway when the detected number in the detecting is one;
    determining whether it is possible to provide all of services provided by multiple service modules mounted to the corresponding module ports of the home gateway when the detected number in the detecting is a plural integer;
    providing the services all together by the multiple service modules when it is possible to provide all of the services;
    receiving at least one function result from the single or multiple service modules; and displaying the at least one function result in a display connected to the home gateway,
    wherein when determining that it is impossible to provide all of the services, the method further comprising:
        determining priorities of the services; and
        providing the services in sequence according to the priorities,
    wherein the multiple service modules include a module for providing an entertainment service, a module for providing a health related service, a module for controlling home appliances, a module for providing environment information, and a module for supporting wireless communication of mobile devices.

2. The method of claim 1, wherein each of the multiple service modules provides a different service.

3. The method of claim 1, wherein each of the multiple service modules provides a different function result, and the displaying comprises displaying the different function result based on the corresponding service module.

4. The method of claim 1, before the receiving, further comprising:
    providing the service corresponding to the single or multiple service modules by functioning the corresponding service module mounted to the corresponding module port.

5. The method of claim 1, wherein the module ports include PCIE ports.

6. The method of claim 1, wherein each of the multiple service modules is interchangeably mountable in any of the module ports.

7. The method of claim 1, wherein
    each of the module ports includes a female portion with first electrical connectors,
    each of the multiple service modules includes a male portion with second electrical connectors, the male portion receivable in the female portion of any of the module ports with the second electrical connectors of the male portion matching with the corresponding first electrical connectors of the female portion.

8. A gateway, comprising:
    module ports to which various service modules are selectively mountable;
    an interface configured to connect to a display; and
    a processor configured to
        detect the number of service modules mounted to the module ports,
        provide a service by a single service module mounted to the corresponding module port of the home gateway when the detected number is one,
        determine whether it is possible to provide all of services provided by multiple service modules mounted to the corresponding module ports of the home gateway when the detected number is a plural integer,
        provide the services all together by the multiple service modules when it is possible to provide all of the services,
        receive at least one function result from the single or multiple service modules,
        send the function result to the display connected to the interface, and
        display the function result in the display,
    wherein when the processor determines that it is impossible to provide all of the services, the processor is further configured to
        determine priorities of the services, and
        provide the services in sequence according to the priorities,
    wherein the multiple service modules provide different services from each other, and
    wherein the multiple service modules include a module for providing an entertainment service, a module for providing a health related service, a module for controlling home appliances, a module for providing environment information, and a module for supporting wireless communication of mobile devices.

9. The gateway of claim 8, wherein the module ports include PCIE ports.

10. The gateway of claim 8, wherein each of the multiple service modules is interchangeably mountable in any of the module ports.

11. The gateway of claim 8, wherein
    each of the module ports includes a female portion with first electrical connectors,
    each of the multiple service modules includes a male portion with second electrical connectors, the male portion receivable in the female portion of any of the module ports with the second electrical connectors of the male portion matching with the corresponding first electrical connectors of the female portion.

12. The gateway of claim 8, wherein the multiple service modules include at least two selected from the group consisting of a module for providing an entertainment service, a module for providing a health related service, a module for controlling home appliances, a module for providing environment information, and a module for supporting wireless communication of mobile devices.

13. A method performed by a home gateway, the method comprising:
    detecting the plural number of service modules mounted to module ports of the home gateway;
    determining whether it is possible to provide all of services provided by multiple service modules mounted to the corresponding module ports of the home gateway based on the detected plural number;
    providing the services all together by the multiple service modules when it is possible to provide all of the services;
    receiving at least one function result from the multiple service modules; and
    displaying the at least one function result in a display connected to the home gateway, and
    wherein the multiple service modules include a module for providing a health related service, a module for providing an entertainment service, a module for controlling home appliances, a module for providing environment information, and a module for supporting wireless communication of mobile devices.

14. The method of claim 13, wherein the module ports include PCIE ports.

15. The method of claim 13, wherein each of the multiple service modules is interchangeably mountable in any of the module ports.

16. The method of claim 13, wherein
- each of the module ports includes a female portion with first electrical connectors,
- each of the multiple service modules includes a male portion with second electrical connectors, the male portion receivable in the female portion of any of the module ports with the second electrical connectors of the male portion matching with the corresponding first electrical connectors of the female portion.

* * * * *